United States Patent

Walker

[11] Patent Number: 5,874,942
[45] Date of Patent: Feb. 23, 1999

[54] SENSOR DATA PROCESSING

[75] Inventor: Peter Joseph Michael Walker, Marsfield, Australia

[73] Assignee: VIR Systems Pty. Ltd., New South Wales, Australia

[21] Appl. No.: 532,602

[22] PCT Filed: Apr. 5, 1994

[86] PCT No.: PCT/AU94/00168

§ 371 Date: Nov. 20, 1995

§ 102(e) Date: Nov. 20, 1995

[87] PCT Pub. No.: WO94/23359

PCT Pub. Date: Oct. 13, 1994

[30] Foreign Application Priority Data

Apr. 2, 1993 [AU] Australia .................................. PL8153

[51] Int. Cl.[6] ............................................... G09G 5/08
[52] U.S. Cl. ........................................... 345/158; 345/161
[58] Field of Search .................................. 345/156, 157, 345/158, 161, 163, 168, 169

[56] References Cited

U.S. PATENT DOCUMENTS

| 4,649,373 | 3/1987 | Bland et al. .................... 345/168 |
| 4,839,838 | 6/1989 | LaBiche . |
| 5,181,181 | 1/1993 | Glynn ............................ 345/163 |

FOREIGN PATENT DOCUMENTS

| 429391 | 5/1991 | European Pat. Off. . |
| 457541 | 11/1991 | European Pat. Off. . |
| 505126 | 9/1992 | European Pat. Off. . |
| 3437456 | 9/1985 | Germany . |
| 92/06465 | 4/1992 | WIPO . |
| 92/11594 | 7/1992 | WIPO . |

*Primary Examiner*—Regina Liang
*Attorney, Agent, or Firm*—Baker & Daniels

[57] ABSTRACT

A method and system for processing data originating from, for example, a joystick type device using attitude sensing, are disclosed. The data is processed using a predefined instruction set, and the current and past states of various parameters, to enable image manipulation and other outputs which do not amount to a direct plotting of, say cartesian position data from an analog joystick. The inventive arrangement allows for virtual output states, temporal modulation of inputs, and enhanced functionality such as automatic power reduction, and autopilot functionality.

25 Claims, 16 Drawing Sheets

FIG. 1
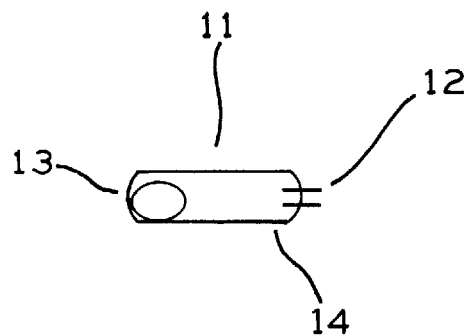
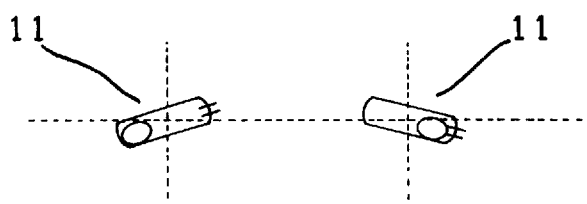
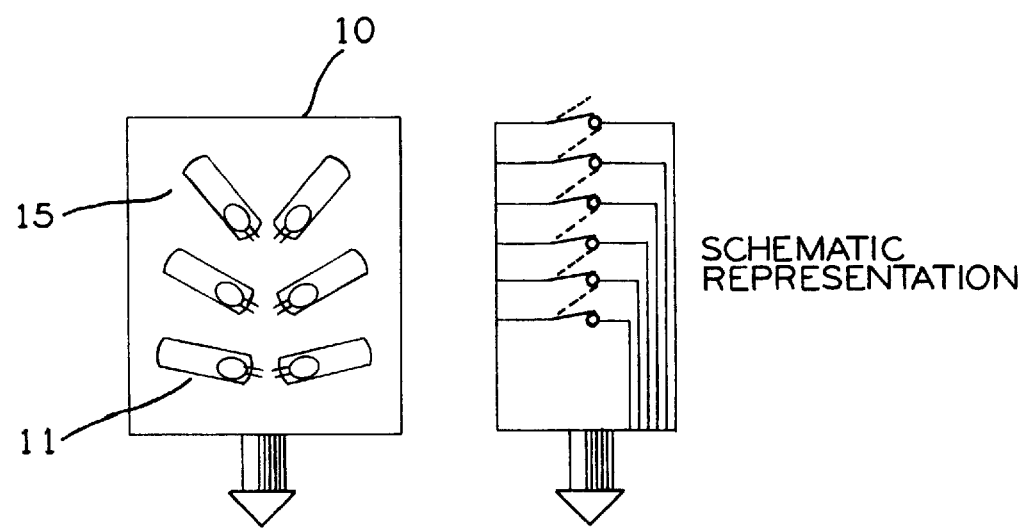

FIG_8
VS / TM PROCESSES
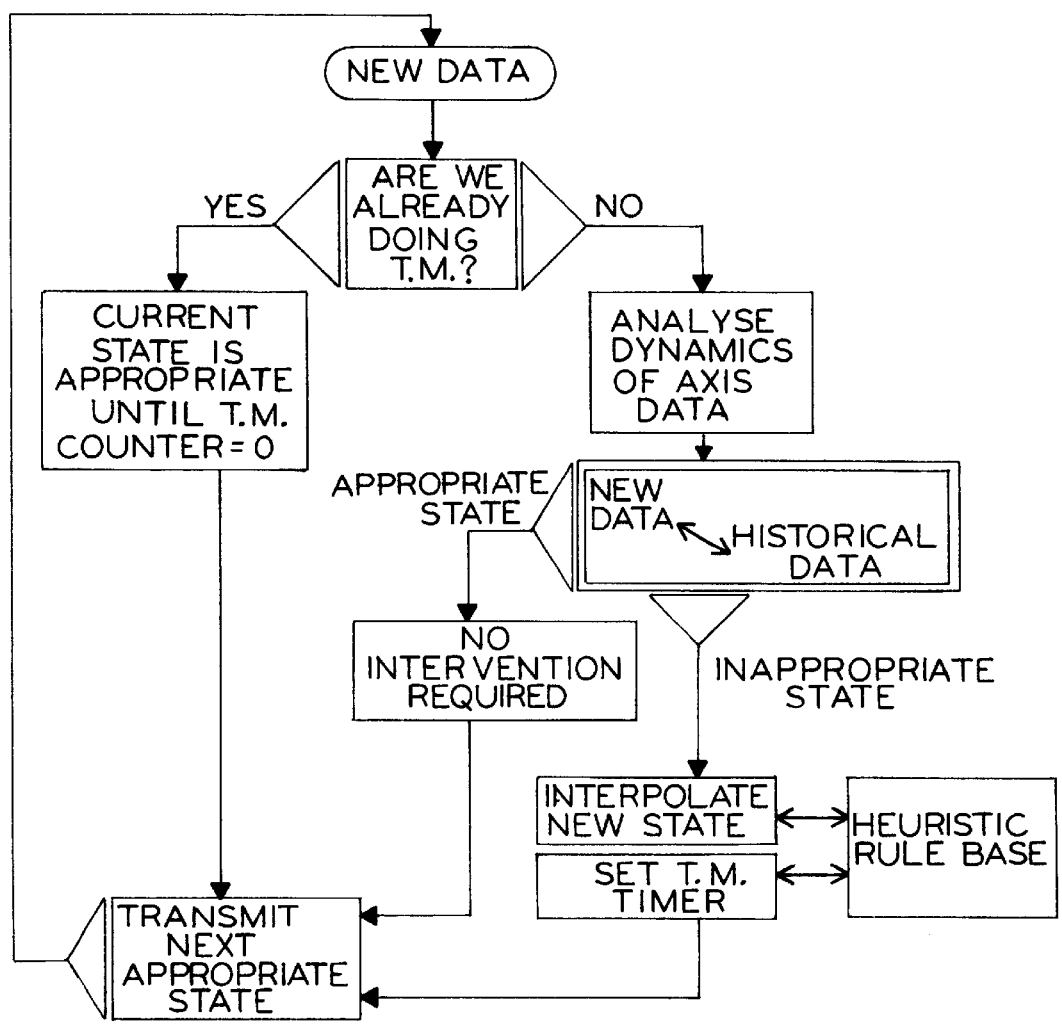
FIG_9
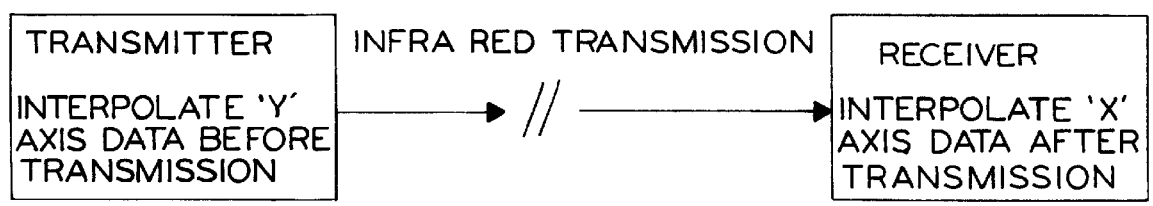

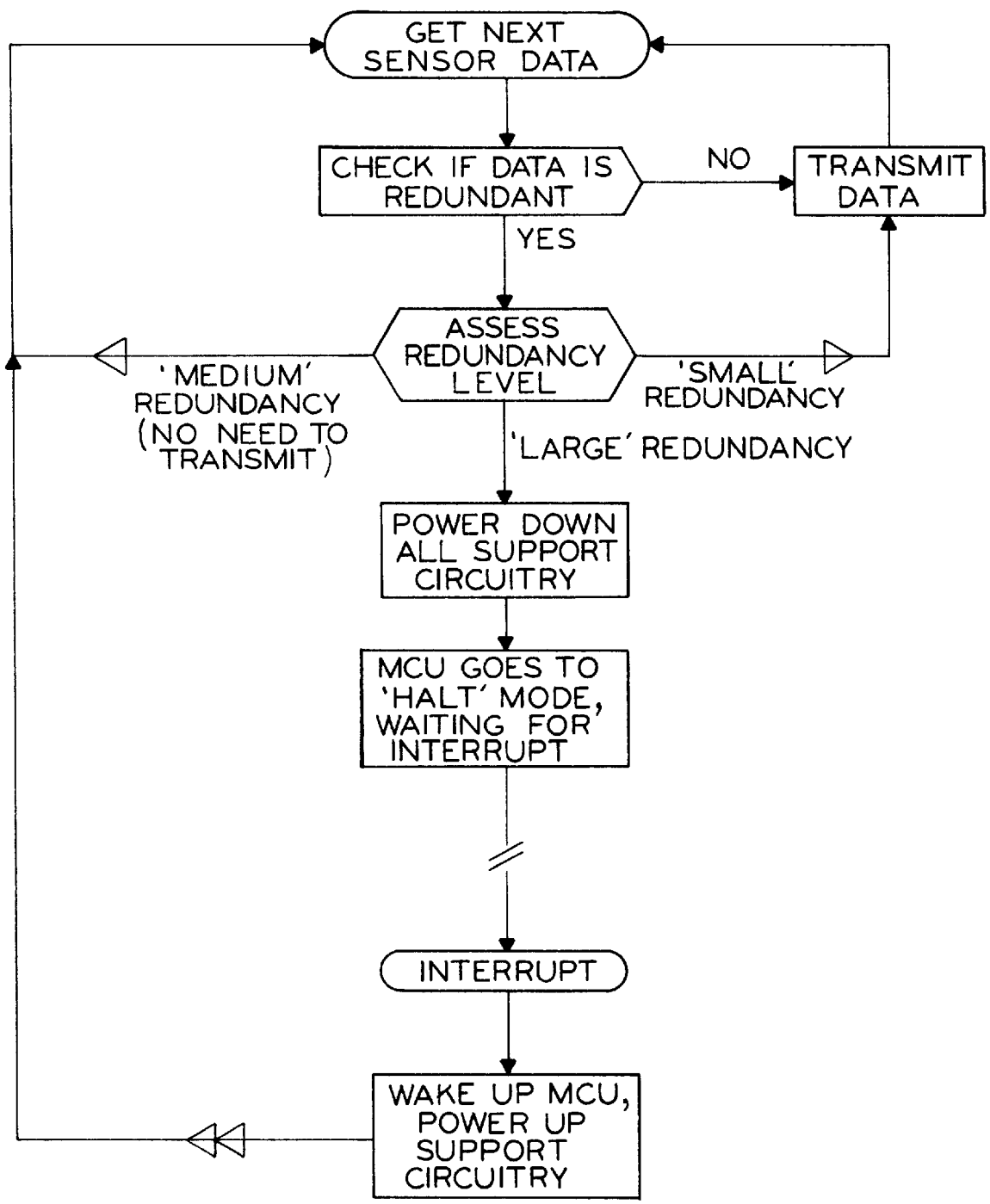

AUTOPILOT

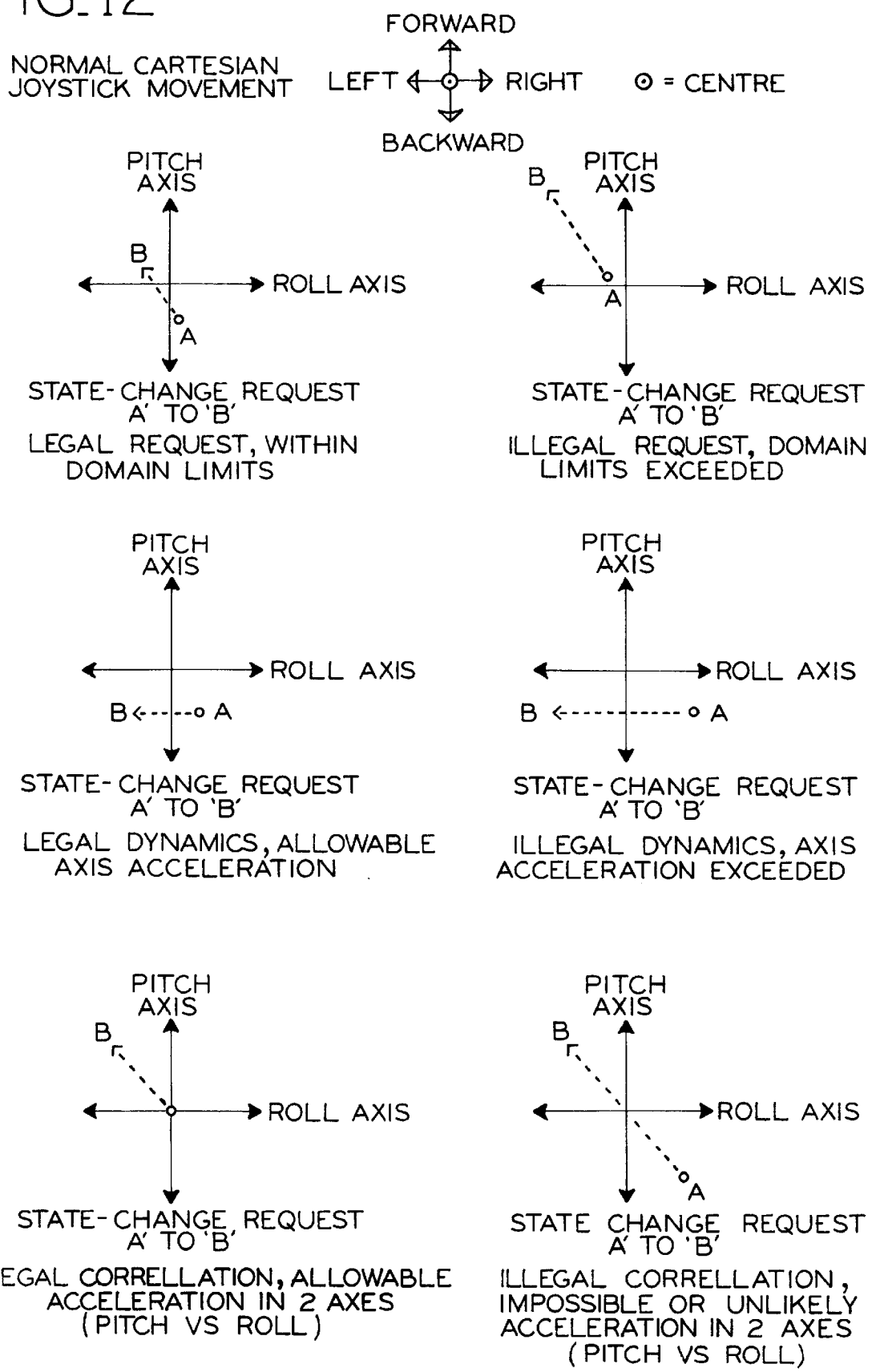
FIG_12

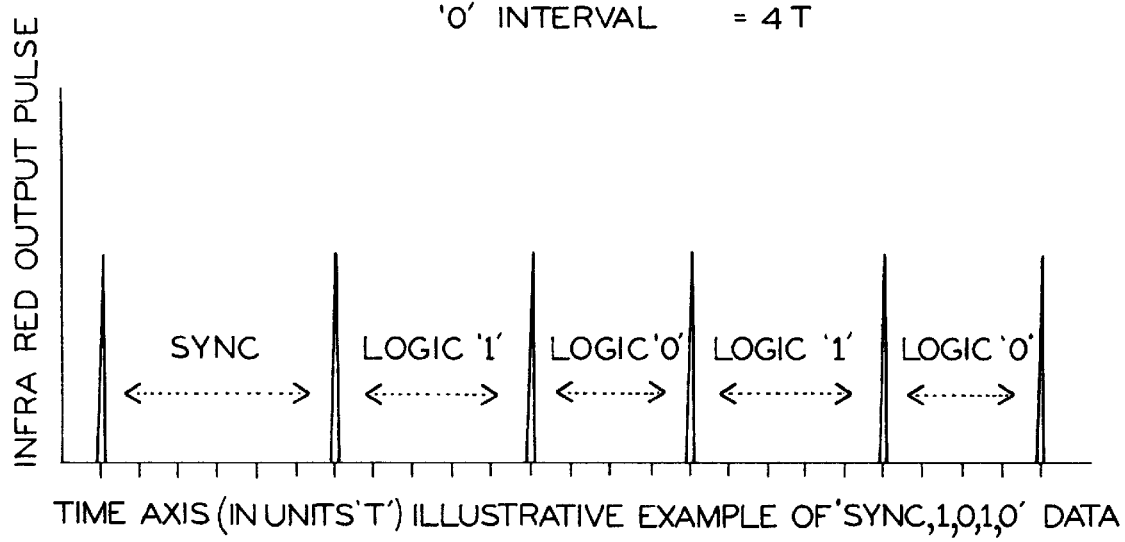
FIG_13
PULSE POSITION MODULATION

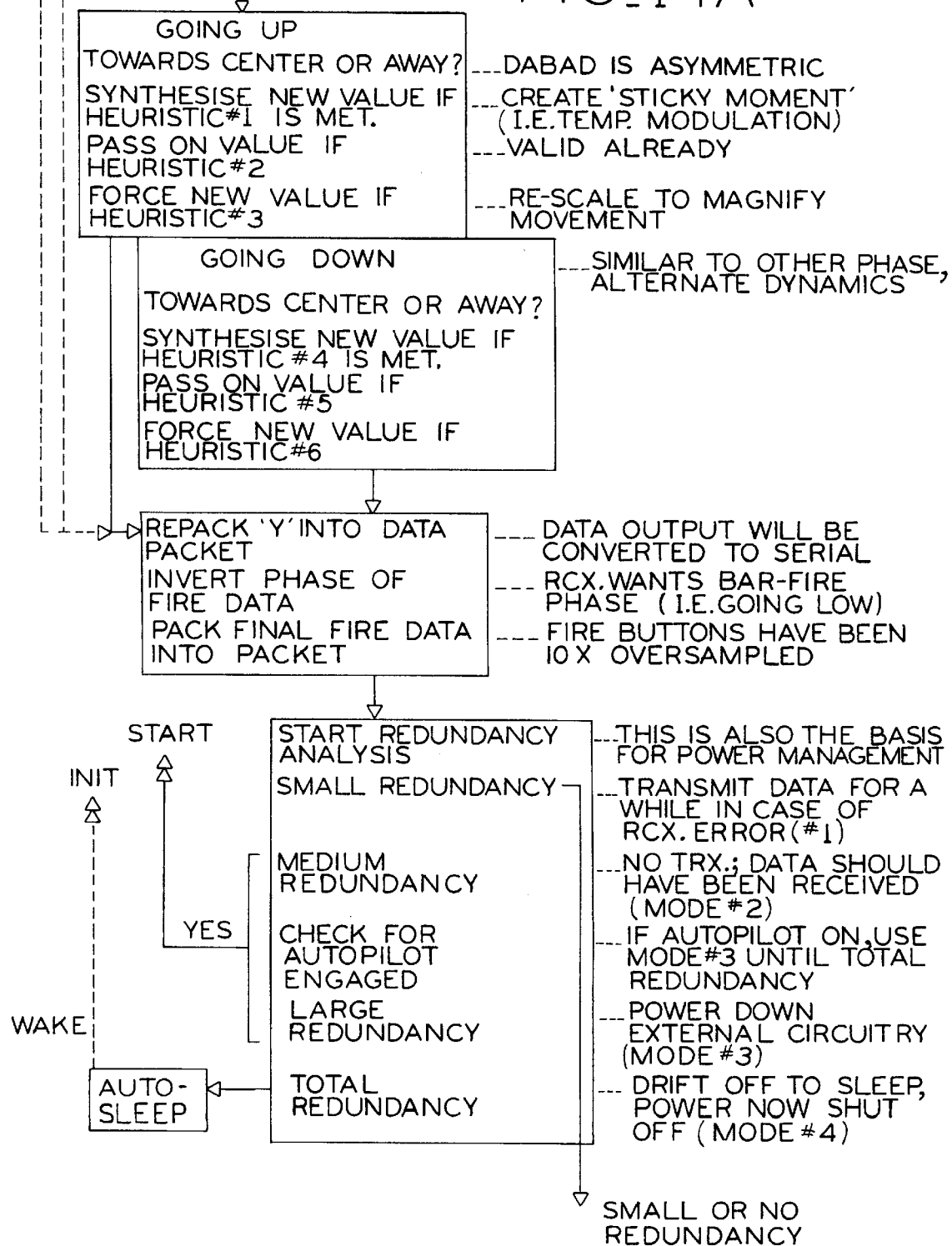

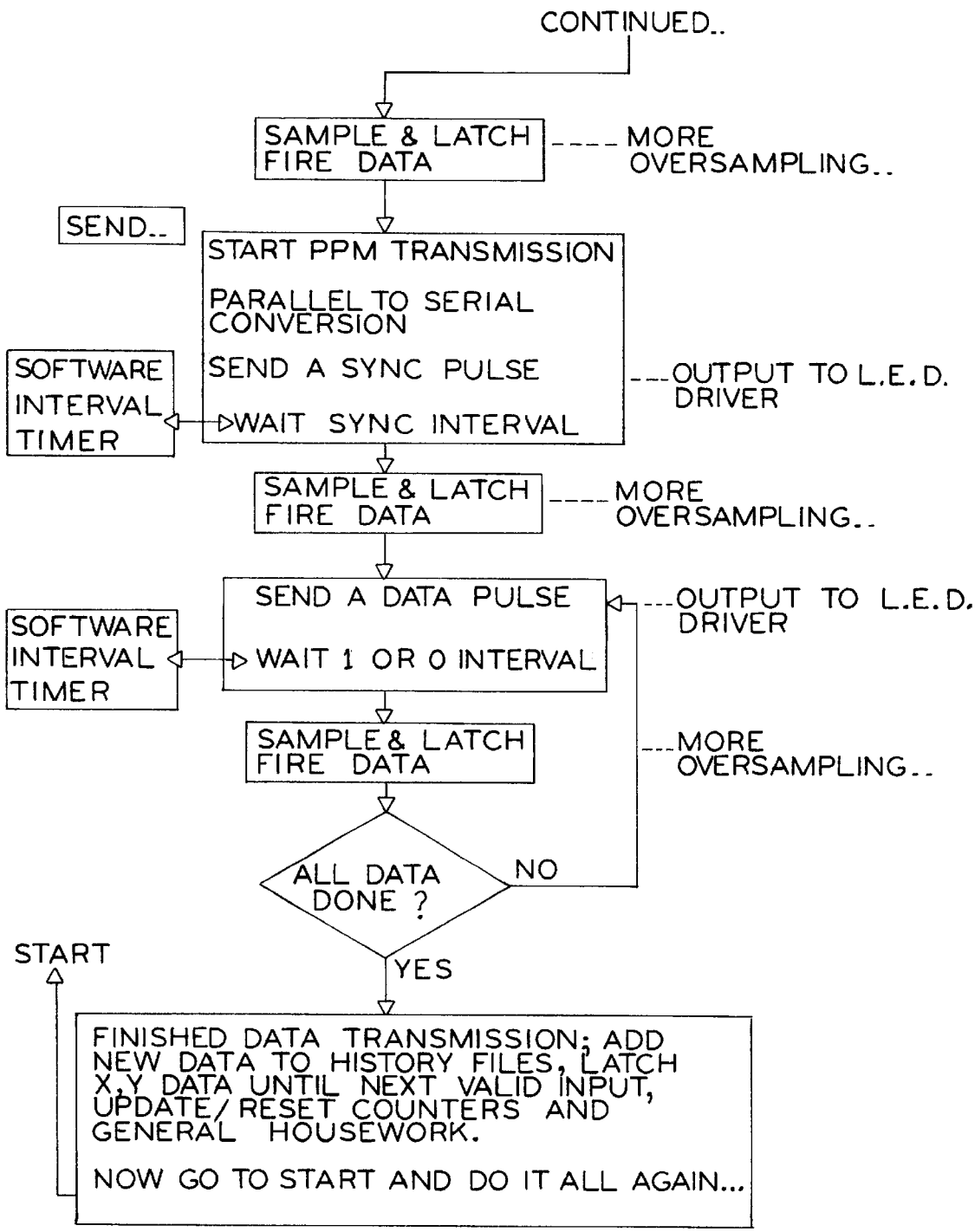
FIG_14B

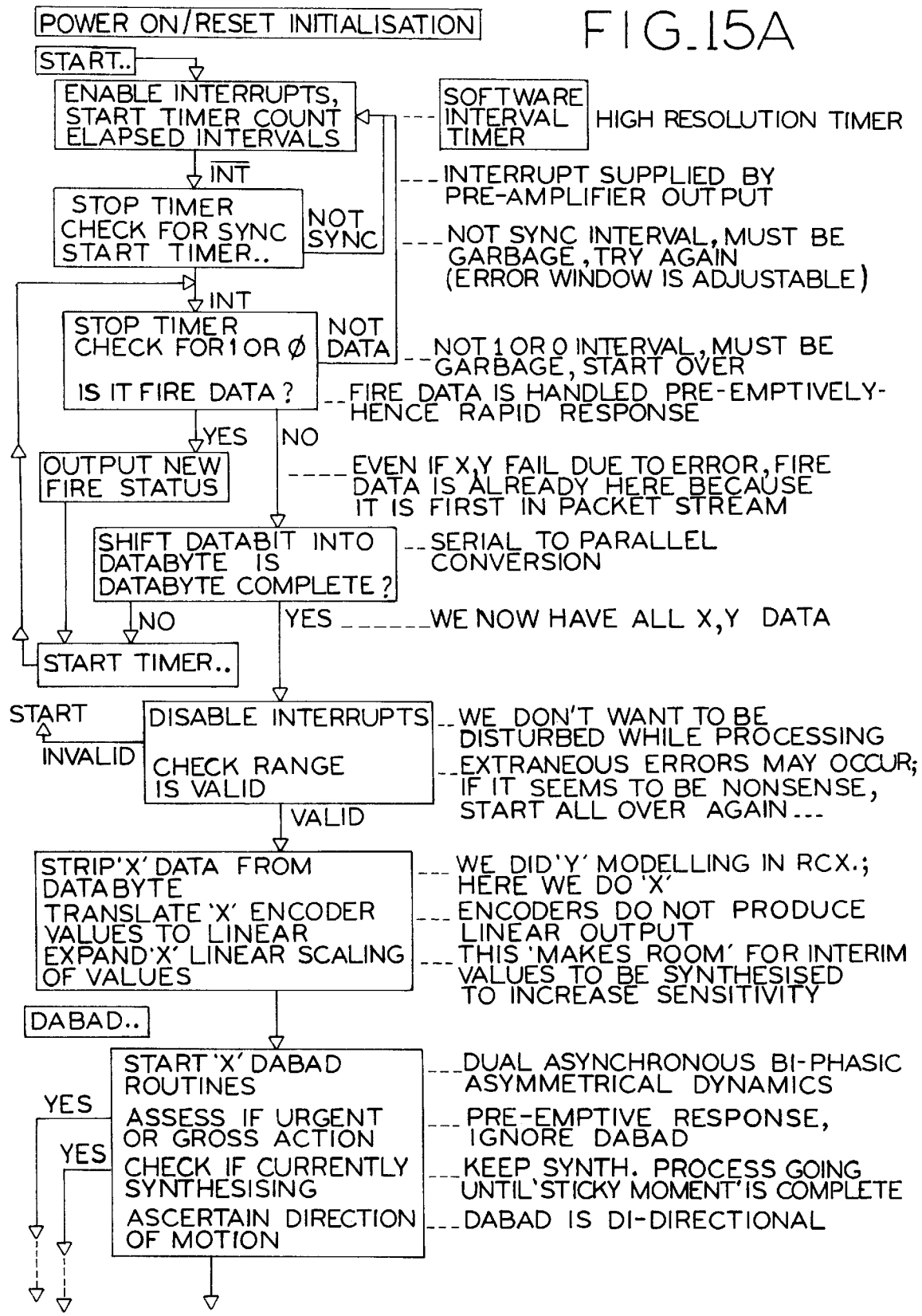
FIG_15A

SENSOR DATA PROCESSING

TECHNICAL FIELD

The present invention relates to sensing, and to the control of computer controlled systems, such as visual displays, using position or movement sensing devices such as joysticks.

BACKGROUND ART

Various devices have been used to control the movement of objects on computer screens, both in the context of games and of application software. Examples include various forms of joystick, mouse and trackball devices. These all provide a simulated movement on the screen in response to a change in position of mechanical parts on the device, for example movement of the ball in a mouse or trackball.

More recently, various devices have been proposed for use in so-called virtual reality systems. These devices tend to be expensive, and rely on complex sensor arrangements arranged in a glove or the like, hard wired to a relatively powerful processor. Such devices rely on a triangulation method to locate the hand held or operated part within a limited field.

All of the above devices provide raw data which is processed by the main computer system, so as to provide movements of images on the screen.

It is an object of the present invention to provide a control system and method, which utilises the positional, attitudinal, movement or similar data to provide additional features for the overall system.

SUMMARY OF INVENTION

According to one aspect the present invention provides a method of processing sensor data produced by a sensing system, said sensor data having a plurality of possible values for each parameter sensed, at least one of said parameters being related to position, attitude or movement of an object, characterised in that for at least one of said parameters related to position, attitude or movement of an object, said sensor data is processed according to a predetermined instruction set, said predetermined instruction set being also responsive to at least one of the group comprising previous values of said parameter, and current or previous values of other parameters, so as to produce output data belonging to a set of possible output data values relating to said parameter, said set including values not directly corresponding to said sensor.

According to a further aspect the present invention provides a system for controlling a computing system, said system including at least one display means, first processing means controlling said display means, and a remote control device adapted to control at least one of the images displayed on said display means, said remote device including a sensing array adapted to produce sensor data corresponding to desired movements of an image on said display means, said sensor data having a plurality of possible values for each parameter sensed, at least one of said parameters being related to position, attitude or movement of an object of the remote device or a part thereof, characterised in that for at least one of said parameters related to position, attitude or movement of the remote device or a part thereof, said sensor data is processed according to a predetermined instruction set, said predetermined instruction set being also responsive to at least one of the group comprising previous values of said parameter, and current or previous values of other parameters, so as to produce output data belonging to a set of possible output data values relating to said parameter, said set including values not directly corresponding to said sensor data, said output data being used by said processing means to control images on said display means.

The present invention utilises the sensor data, produced from sources ranging from analog joystick, attitude sensors, virtual reality sensors of various types, mouse type devices and other related position, movement or attitude sensing arrangements, to do more than simply control a screen image in accordance with the go left, go right, type instruction produced. The present invention, in a preferred implementation, allows extra states not defined by the sensor outputs to be produced on the screen, either pre-emptively (for example when a gross movement occurs) or by reference to previous states with intermediate steps interpolated. Excessive or illegal movement, produced by transient error or unusual user behaviour, can be forbidden and other outcomes substituted pending fresh sensor data. This can occur within a given parameter, e.g. the x-axis movement or roll plane, or by correlation between multiple axes or with other parameters.

One benefit is that a sensing array with relatively few parameters can be effectively expanded so as to produce a larger possible range of outputs. User movements can be more accurately translated to the display under control, or to a processor in a virtual reality sensing arrangement, where direct screen display may not be the normal outcome. Thus, an intelligent remote device, rather than a mere coordinate or direction indicator, can be provided.

BRIEF DESCRIPTION OF DRAWINGS

An illustrative embodiment of the present invention will now be described with reference to the accompanying figures, in which:

FIG. 1 illustrates the principle of a preferred attitude sensor;

FIG. 8 is a flowchart describing virtual state and temporal modulation processes;

FIG. 9 illustrate an example of split processing;

FIG. 10 is a flowchart describing the autosleep and redundancy processes

FIG. 12 illustrates examples of error detection by software correlation;

FIG. 13 illustrates a preferred communication protocol;

FIGS. 15A and 15B provide a flowchart illustrating an embodiment of the receiver unit software.

DETAILED DESCRIPTION

Figure 2:
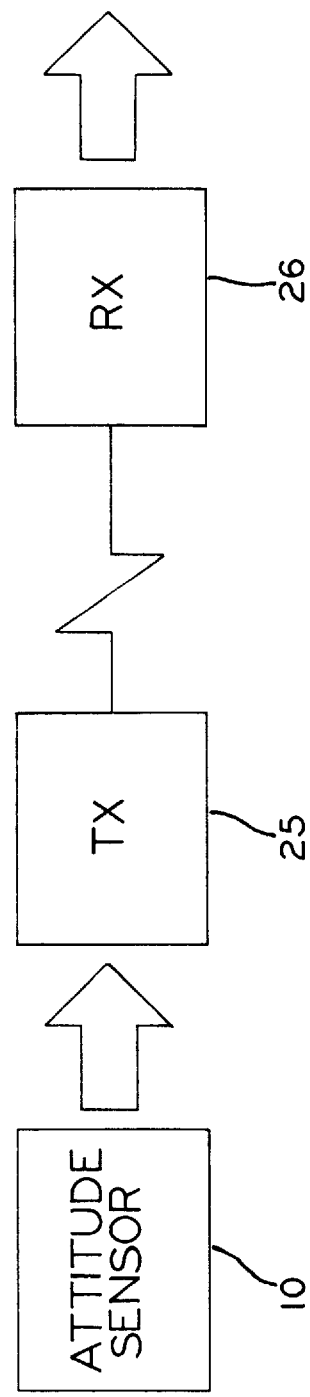
FIG. 2 illustrates schematically the preferred system arrangement.

The following description refers to the general principles of the present invention according to a single embodiment.

It is emphasised that whilst the mercury switch array shown and described is presently preferred, the invention is not limited to this device, and alternative sensing systems and devices may be substituted. For further details of the switch array and the principles of the inventive control system, the reader is referred to co-pending PCT applications by the applicant having the same filing date entitled Improvements to Attitude Sensing, and Attitude Sensing Array, the disclosures of which are incorporated herein by reference.

It will be understood that the preferred sensor described senses attitude, rather than x, y, cartesian position—however, for the sake of brevity the terms x and y axis will be used in the specification to refer to roll and pitch data.

Referring to FIG. 1, an array 10 of mercury tilt switches 11 forms the preferred basic attitude sensing device for use according to the present invention. The switches 11 occupy different alignments to allow for sensing of different degrees of tilt. Such switches are of conventional type, employing an glass capsule 14, a pair of contacts 12, and a small quantity of mercury 13. Tilting causes the switch to be open or closed depending upon the degree of tilt. Such switches have been experimentally determined to be very reliable in use, and very robust. An additional advantage is the inherent digital output—any given switch is either on or off, and so can be directly input to digital processors.

By determining which switches are on or off, and preferably also considering which were previously on or off, a determination of attitude can be made. Preferably, the array is formed in a plastic or resin moulding 15, so that high precision is possible in the arrangement, even in a volume manufacturing situation. Any suitable connection scheme may be used.

The attitude sensor is preferably contained within a hand held device, so as to function like a joystick in a conventional system. However, the preferred system does not require a mechanical joint as in a joystick—the reference plane is provided by gravity. It will also be understood that the preferred system is applicable to related but distinct applications, such as mouse and trackball type system replacement, and to sensing attitude based on movements of other parts of the body. For example, the inventive arrangement may be used in a virtual reality type application to sense head movements, so as to control a display and show an appropriate field of view, or to sense movements of other parts of the body. Several devices according to the present invention may be employed simultaneously, using different or common base units. However, for the sake of clarity the joystick-type device will be used to illustrate the principles of the sensing system with respect to which the present invention will be described.

Figure 5:
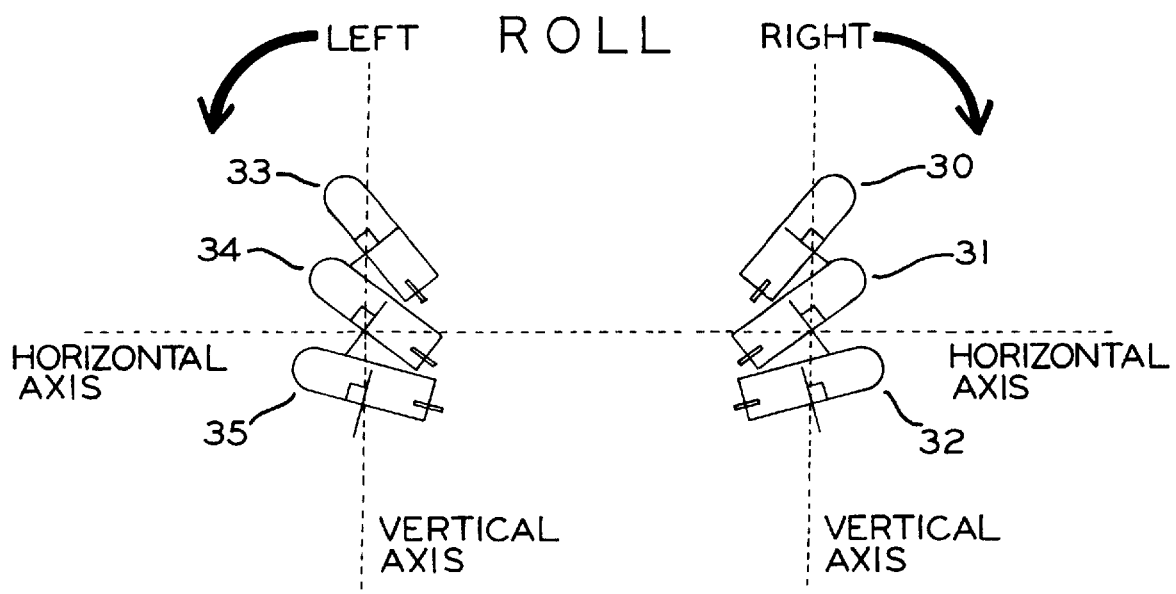
FIG. 5 illustrates one arrangement of switches to form an attitude sensor in one axis.

FIG. 5 illustrates the x-axis, or more properly, the roll sensor arrangement. It can be seen that a total of seven states of attitude can be directly sensed on the plane, depending upon the degree of the tilt of the sensor array in the plane of measurement.

Referring to FIG. 2, in block form the overall arrangement provides for the attitude sensor to provide output to a transmitter unit, which encodes the data for transmission to a base unit, which in turn may drive a conventional joystick port or the like. It will be appreciated that the embodiments described are intended to be illustrative and not limitative of the scope of the invention. The components will be described in more detail below.

This arrangement provides a fully autonomous remote unit, which is relatively low cost, yet provides a reliable high slew rate sensing mechanism. The design allows for a small number of active components. The device is microprocessor based, and does not require any initial complex alignment procedure to be carried out.

The present invention may be employed if desired using a hard wired link, but a wireless link is preferred, and is far superior in practical operation.

The link, it is emphasised, need only send encoded attitude data. There is no triangulation involved, so that processing requirements are much reduced. Range is purely limited by the communications link—it is not confined to a defined operating space.

The present invention is concerned with the processing of data, preferably obtained from a system as described above, but which could be obtained from other sensor inputs. To provide operation which is most consistent with the control movements of the user, the present invention seeks to not merely translate x,y Cartesian data into a screen pixel position, as is conventional. The inventive system processes the attitude or other position data so as to provide further features and outcomes than is possible using the data as a mere mapping or movement instruction.

Remote Unit

Figure 3:
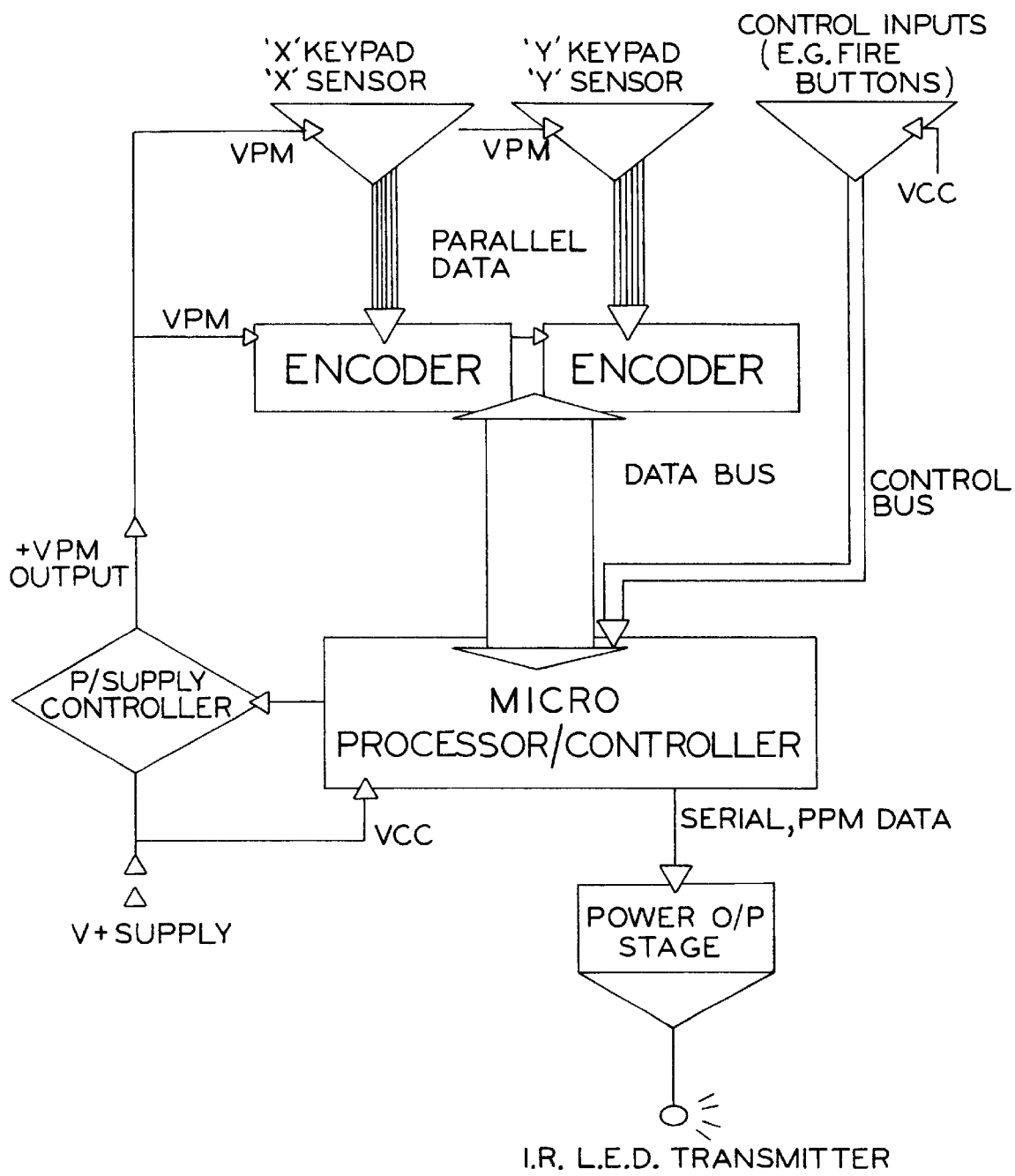
FIG. 3 shows schematically an illustrative transmitter arrangement for the remote device.
Figure 14A:
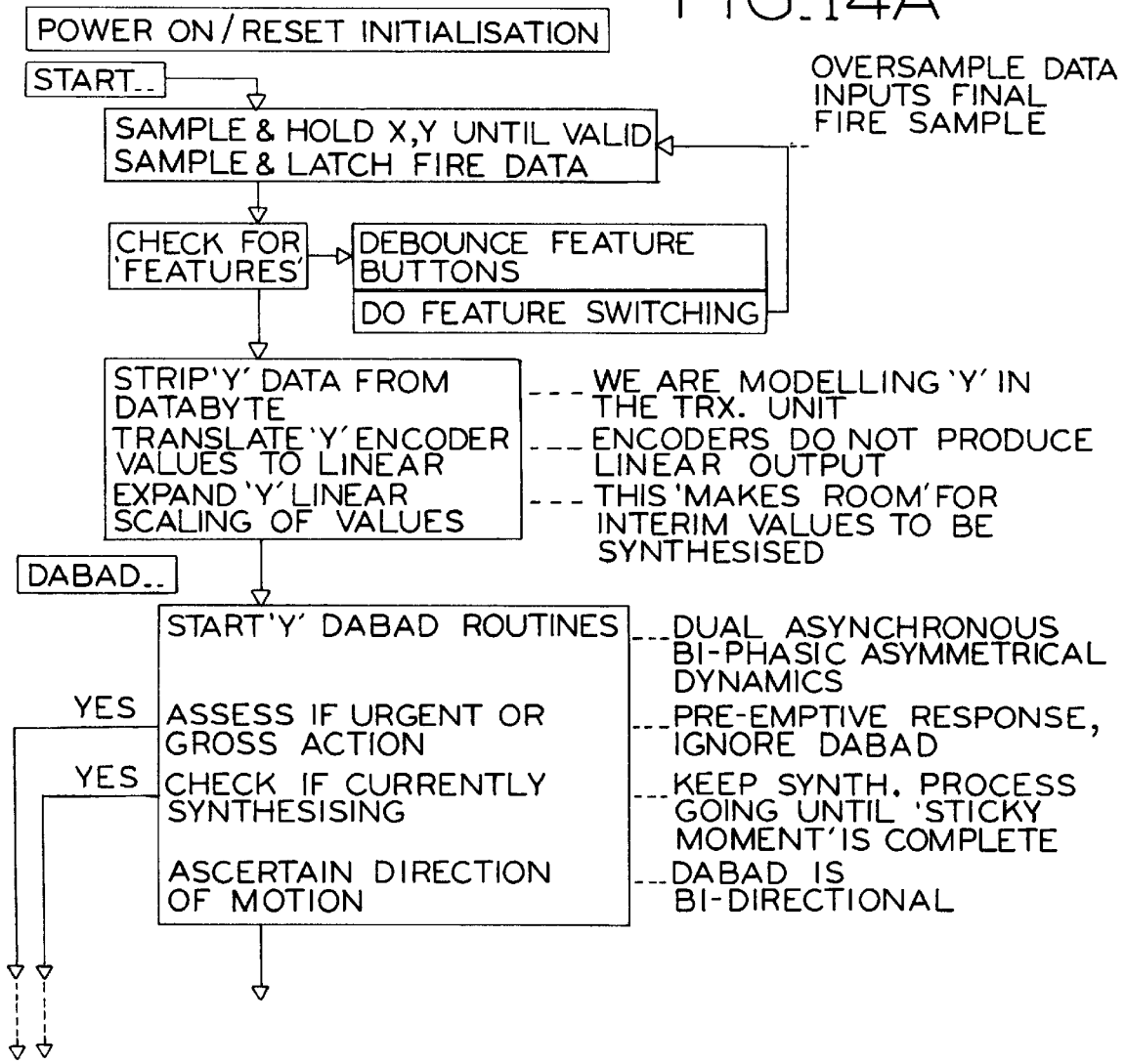
FIGS. 14A, 14A' and 14B show an flowchart describing the operation of an embodiment of the remote unit software.

With reference to the preferred sensor arrangement, switch data, which is quantised attitudinal data values in two axes (x, y for convenience—although strictly roll, pitch), is processed by the transmitter unit. Referring to FIG. 3, x and y data is received asynchronously in parallel and encoded into 3 bit binary formats by two conventional encoder i.c.s. Data may also come from keypads (preferable for certain applications) and additional indicators, e.g. fire buttons. In the illustrative embodiment, the six encoded data lines are grouped with 2 fire data outputs to form an 8 bit data bus as input to the microprocessor. Raw data is oversampled and latched before presentation to firmware embedded in the processor, which performs five major functions:

1) dynamic modification of 'y' axis data using pre-defined modelling
2) 'intelligent' redundancy analysis and 'bandwidth' expansion
3) parallel to serial conversion with Pulse Position Modulation encoding
4) power management including AutoSleep (i.e. no OFF switch is used)
5) features enhancement e.g. Autopilot, mode switching etc. A detailed flowchart is provided in FIGS. 14A and 14B, which will be discussed in detail below.

The IR transmission protocol selected is preferably power efficient, and the encoding is provided by the microprocessor. Suitable transmitter components are commercially available. The IR transmission protocol is unlikely to provide interference with domestic appliances which are carrier based. The corresponding receiver preferably has a wide capture angle, allowing for the minimisation of range and alignment problems in use. A preferred technique is described below.

Pulse Position Modulation

This is the preferred method used to encode all data transmissions. The encoding is a serial protocol, logically akin to serial protocols used in computer communications.

The physical format uses three fixed time intervals between pulses to determine their logical value. A special interval, 'sync' is used to signify the start of each data packet. Two other intervals represent logic 1 and logic 0. They are chosen in ratios which are not simple arithmetic multiples, to assist in discrimination (e.g. 6:5:4 or, prime numbers like 13:11:7). The significant benefit of PPM is in the greatly reduced power consumption for a given output signal strength (hence, operating range). This is due to two inherent features:—the lack of a carrier frequency, and the brevity of the 'mark' pulse compared to the length of the 'space' between them. Referring to FIG. 13, an example of the protocol is provided. Different intervals between pulses define the value of the signal sent. This places lower demands on all components of the output stage, as the pulses are of very brief duration (e.g. 10uS or less).

Another aspect of PPM systems which is exploited, is the predictability of pulse arrival. Software processes according to the preferred embodiment can utilise this 'mark-space' predictability to ignore ambient interference during the known 'space' intervals. Similarly, hardware techniques familiar to those in the art are used to block out random interference by 'pulse stretching' the received pulse, for a period slightly less than the shortest valid 'space' interval. This inhibits any other input during the stretch period.

It will be appreciated that apart from allowing for reasonable line of sight, in the IR implementation, there are not specific requirements for base station placement.

An IR signal is output from the transmitter via (in this embodiment) an LED, preferably a wide angle transmission device.

Base Unit

Figure 4:
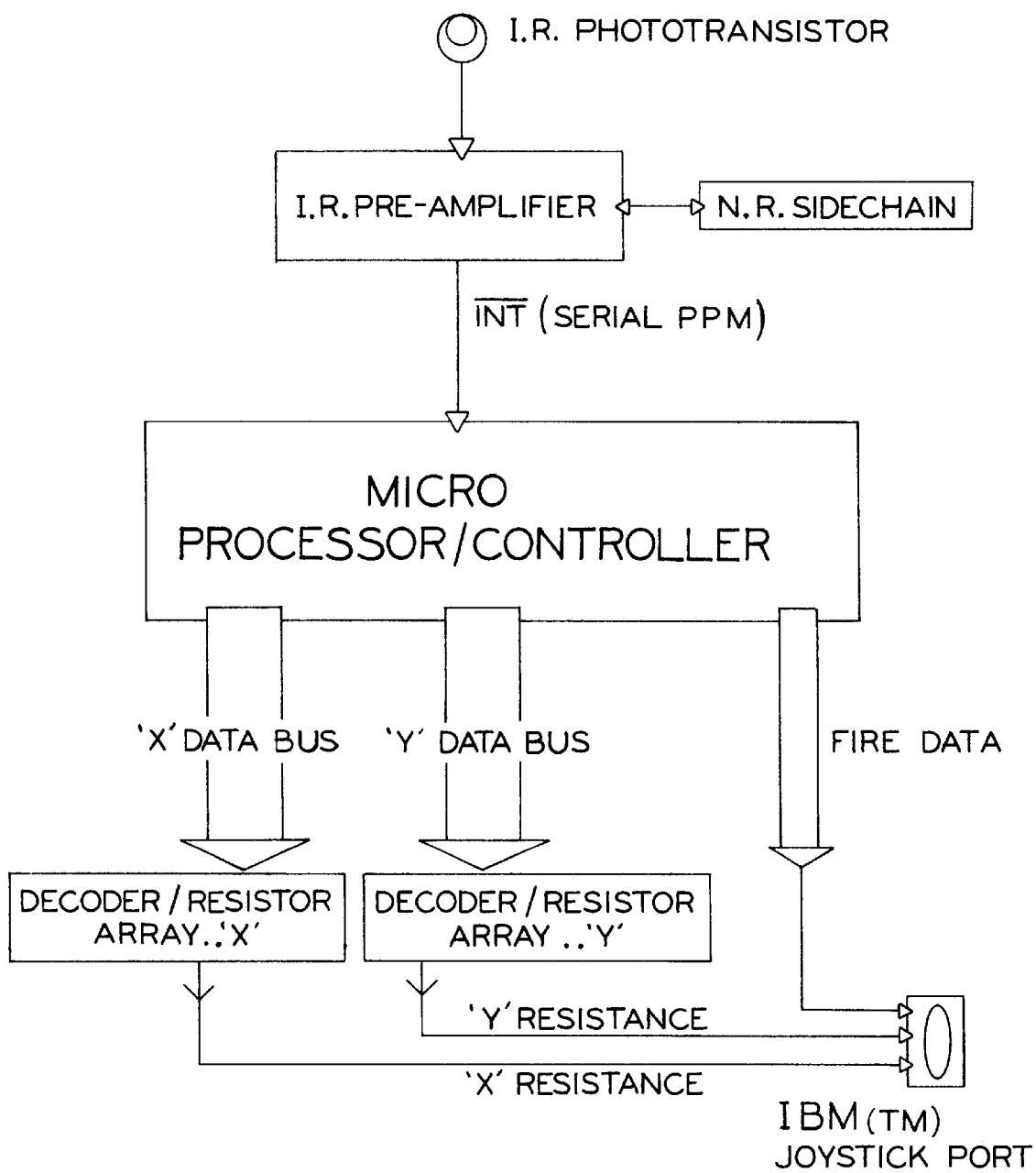
FIG. 4 shows schematically an illustrative receiver base station.

Referring to FIG. 4, the IR signal is detected by the IR phototransistor, pre-amplified, noise reduction applied (AGC, high pass filtering, pulse stretching etc.) to provide an interrupt line input for the microprocessor.

Figure 15B:
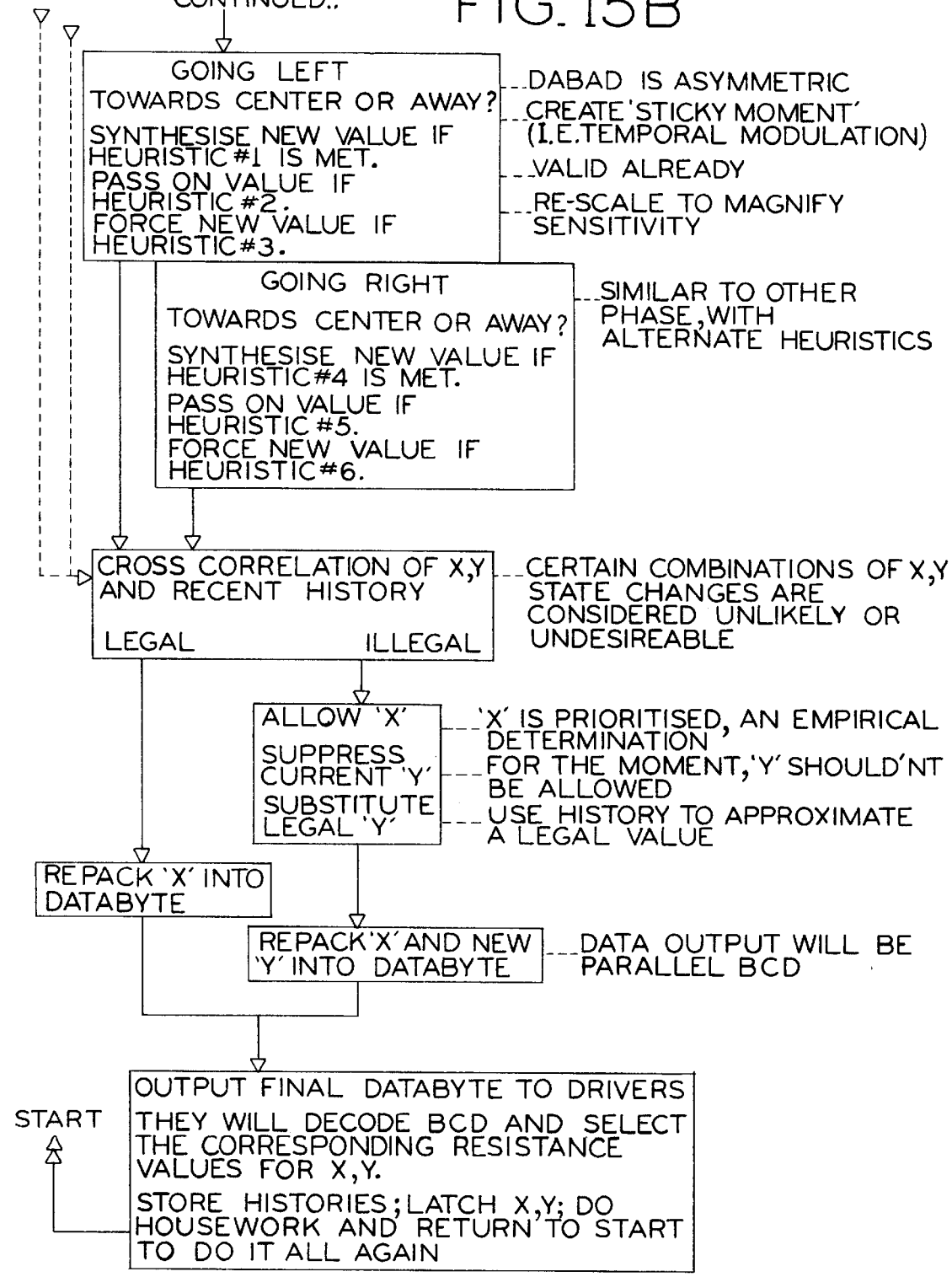

The embedded receiver firmware performs four major functions:

1) error checking/data validation
2) serial to parallel conversion of Pulse Position Modulated data stream
3) dynamic modification of 'x' axis data using proprietary modelling techniques including x, y correlation
4) digital selection of appropriate resistor values to provide a synthetic proportional output. A more detailed flowchart of the software processes is provided in FIGS. 15A and 15B.

X-axis data is decoded and processed, so as to improve the operation in practice. Absolute sensor movement is modified by temporal modulation algorithms, so as to linearise apparent acceleration, and provides predictable small state change response. Pseudo-states are synthesised asymmetrically to dynamically expand the bandwidth of sensor data. This synthesis occurs asynchronously to Y-axis data. Cross-correlation of X and Y axis data is performed, so as to permit illegal state changes to be suppressed.

The output is derived from two standard analog switching i.c.'s driving an optimised resistor array. This array replicates the variable resistors normally found in proportional joysticks, but suffers from none of the usual drift problems caused by wear and tear on the resistance elements.

The hand piece incorporating the remote device is preferably designed to exploit the natural attitude sensing abilities of the bridge formed between the thumb and fingers when the hand is held as if you were about to 'shake hands'. Such a design enforces a particular holding attitude, and this is further enhanced by displacement of the centre of gravity.

A detailed description will now be provided of several inventive implementations of the sensor processing according to the present invention.

Virtual States/Temporal Modulation Processing

VS/TM processing is a resolution enhancement method particularly suited to any low resolution system, but also applicable to systems of any resolution. Whilst the system will be described with reference to the preferred sensor embodiment previously described, it will be appreciated that it is applicable to other sensor arrangements.

Methodology and Processes

Data, signifying an attitudinal state, is generated by the preferred sensor method. For this example, it is presumed that the data is already in digital format, and made up of a group of (n) bits, encoded on a Binary Coded Decimal (BCD) bus. This is typical of most methods, but the process described here is not dependent on this representational form. This group of BCD bits uniquely represents a larger set of what will be described hereafter as attitudinal state numbers, in a compact manner. By way of example, FIG. 1 depicts the attitudinal state numbers for a notional sensor. A two bit BCD bus can represent 4 state numbers, 3 bit=8 state numbers, 4 bit=16, and so on.

Figure 6:
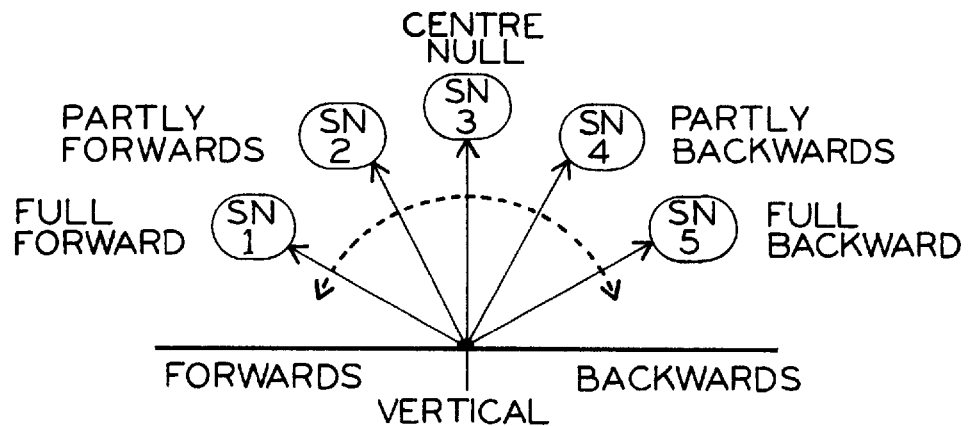
FIG. 6 illustrates sensed states using the illustrative attitude sensing array.

The example shown in FIG. 6 detects 5 attitudes in the pitch axis, requiring 5 state numbers, which necessitates a bus size of at least 3 BCD bits. In conventional systems, the number of bits (n) per axis defines the resolution of the sensor method.

The traditional way to expand resolution is to add further bits, giving more unique BCD numbers to be used as state numbers, which can describe greater resolution. The process detailed below can be applied in this manner, with the consequence that more bits are required to encode the overall data packet. However, the total number of bits used should be kept as small as possible for efficiency, especially in applications requiring data transmission. Significantly, the process described can also be applied within the chosen group bit size (n) by exploiting any spare BCD combinations which are not currently needed to express the original resolution of the sensor method. This is advantageous because it maximises the bandwidth usage of any sized bus with simple software routines, readily adaptable to any sensor metrics, without changing the bus bit size. Any system, based on analog or digital sensors, can be enhanced. The process described also provides resolution enhancement that is particularly effective in difficult environments which suffer from: low sample rates, low transmission rates, low innate resolution, difficult error correction or economic constraints.

Figure 7:
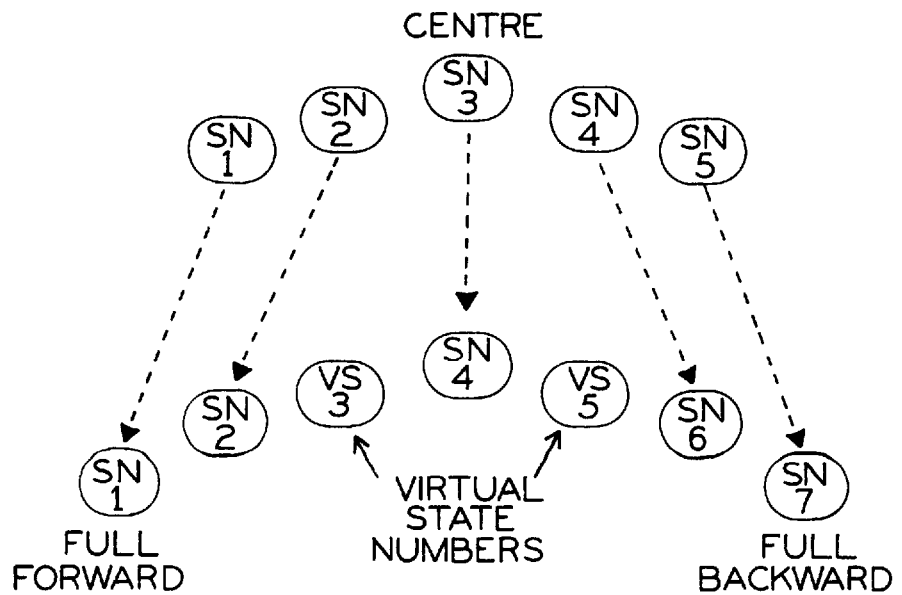
FIG. 7 illustrates the provision of virtual states in the FIG. 6 embodiment.

After decoding the BCD data, software algorithms mechanically 'stretch' the number of states, by (in this implementation) scalar expansion from the centre, outwards. FIG. 7 shows this re-scaling process as applied to the notional sensor from FIG. 6. In this example, no extra bits have to be added despite the forthcoming enhancements; the routines exploit 'spare' state numbers within the group bit size.

This re-scaling preserves the relative positional values of minimum, maximum and null (i.e. full forwards, full backwards and center—see FIG. 6), but creates gaps in the intermediate values, for which there are no physical sensor states. Left in this condition, the transitional resolution is now 'lumpy' (i.e. larger gaps between some states) because the original data resolution is insufficient to 'join the dots'. There are, however, state numbers available to represent more states, because they are not being used by the real data. It is these spare state numbers which will be utilised to represent Virtual States.

Next, contemporary data is correlated with historical data for that axis. If pre-defined heuristics are met—involving direction of travel, magnitude of state change and acceleration components—an interim output value (a virtual state, for which there need not be a corresponding physical state in the sensor) is synthesized, between the 'real' output values, for a defined period of time. This is the Temporal Modulation period or sticky moment; it can be altered to suit various system dynamics. FIG. 8 illustrate the processes necessary to implement VS/TM concepts in the preferred sensor arrangement. Three examples of applied VS/TM principles and their corollaries are detailed hereafter.

1) Because of VS/TM intervention, all small (but varied) state-change requests elicit from the software routines a predictable change in output, hiding the variability of the actual requests. For example, any 'small', 'moderately small' or 'very small' request can be quantised into a 'known small' change for a defined time. Furthermore (and especially in low resolution systems), a request can be broken up into a 'known small' change followed by a larger change if the original request persists. Persistence prompts the algorithm employed in the software process to recognise the need for a larger state change. In either case, the availability of the smaller step change for a cognitively recognisable period can be exploited by the user, without the need for an actual permanent state in the sensor. Small adjustments in attitude are achieved more intuitively. The process therefore hides traditional artifacts produced by lack of resolution, poor mechanical sensor performance at low slew rates and sensor indeterminacy errors.

2) Because of VS/TM intervention, large state change requests are performed using selected virtual states with temporal modulation delays between them. This provides an idealised state-change curve to describe the required large change, hence greater apparent transitional resolution. If the original request persists for a certain period (i.e. it wasn't an inadvertent transient overshoot), the actual state requested will eventually be reached because the virtual state-changes 'add up' to the original request.

3) Because of VS/TM intervention, the magnitude and sensitivity of dynamic response of the system is configurable to suit varying degrees of physical manipulation of the sensor device. As an example, in the preferred sensor arrangement, VS/TM is applied to the pitch axis in order to magnify the range of wrist movement (i.e increased sensitivity to pitch), whilst also being applied to the roll axis to increase transitional resolution (i.e. more states to 'join the dots').

In summary, utilising virtual state/temporal modulation processing provides the following advantages:

a) the process maximises bandwidth usage with flexible software methods.

b) the process adds virtual attitudinal states to the output data, giving greater apparent resolution ('transitional smoothness') than a chosen sensor method innately possesses.

c) the process linearises small response performance, imposing a level of predictability which can be more intuitively exploited by the user.

d) the process greatly facilitates the control or elimination of dynamic sensor overshoot.

e) the process can independently exert control over dynamic sensitivity.

The whole VS/TM process can be applied in distinctly different modes. In one possible mode, the process can be used purely to augment the absolute values found in the sensing method by adding virtual states; this could be termed enhanced absolute mode.

In another mode, no real values exist in the output data; they are all synthesised virtual states where no state uniquely represents a physical sensor state, but rather its interpolated attitudinal value based on multiple parameters. This would be termed enhanced interpolated mode. Further, to those familiar in the art, it will be obvious that other modes, and mode combinations are possible, for example, delta or relative analysis of the data, which is based on examining differences between data samples rather than any absolute value. This mode would be defined as enhanced relative. Delta modulation in broadcasting and communication is a well known, efficient method. The efficiency of the method is inherited in this analogous approach. Significantly, in a delta system, output resolution is completely unrelated to input data bandwidth because the bandwidth is used to transfer the maximum legal state-change, which does not have to encompass the absolute maximum state-change range. Hence, the range of output values (dynamic range) can be independently determined, providing much greater system output bandwidth or resolution. Combinations of relative, absolute and interpolated enhancement can be accommodated within the same VS/TM framework, by encoding suitable heuristics into the model. The VS/TM processes are not mode dependent, and can be applied to any sensor method, of any innate resolution.

Another aspect to VS and TM processes is that they can be employed independently of each other.. e.g. temporal modulation can be applied to 'real' states as well as virtual ones. This allows the software algorithms the greatest flexibility when choosing the most appropriate next output state.

Dynamic processing

The embedded software routines, described as DABAD (dual asynchronous bi-phasic asymmetrical dynamics) in the accompanying flowcharts, perform these VS/TM processes independently on each axis. The fact that the 'Y' axis is performed in transmitter unit 25, and 'X' by receiver unit 26 in the preferred implementation described above is not significant in this context; even if they weren't physically independent, they are logically so. Logical independence allows each axis to be treated differently, where this is dynamically appropriate.

This independence is also asynchronous: different treatment is accorded each axis dependent on its own temporal/historical framework, asynchronously to any processing of the other axis. This allows any combination of VS/TM or pre-emptive processes to occur.

The processing is applied to state-change requests in either phase or 'direction' (i.e. towards the center or away from center). Different results will be produced from identical magnitude state-change requests of a different phase. The processing preferably utilised according to the preferred implementation is 'bi-phasic' in nature. However, the technique can be expanded to cover any number of 'phases'.

The processing is also asymmetrical in two ways: different degrees of 'intervention' occur near the centre compared with the extremities of the operating region, and different degrees of 'intervention' are invoked by small state changes, as opposed to large state changes.

Split Processing

In traditional systems, data gathering occurs in the transmitter unit, and data processing is located in the receiver. This is readily achievable in unrestricted environments, utilising powerful and expensive technologies. Desirable (and economically feasible) systems need to employ alternative strategies in order to provide satisfactory performance with modest componentry. A method of extracting greater performance within predefined constraints is split processing—an allocation or sharing of processes between the available processing units in the system.

The fundamental principles of split processing can be applied to any data transmission system by following simple guidelines. Processes which may be onerous in their effect on required transmission bandwidth, for example, are performed at the receiving end of the chain. 'Spare' processing time in the transmitter may be used for other tasks. Significantly, the advantages inherent in split processing are not constrained to systems utilising the VS/TM based methods described above; any system can be analysed and may benefit by intelligently separating it's tasks between it's component units, for example, a conventional analog joystick utilised in a cordless system.

An example of the process which is applied in the embodiment of the invention utilising the preferred sensor arrangement in a joystick type device exploits a natural characteristic of human wrist reflexology. Lateral-roll (side to side) wrist motions have a greater range than vertical-pitch (forwards-backwards) ones. Notionally then, the 'roll' axis should be accorded a greater percentage of transmission bandwidth to represent these motions with the same resolution. It is however preferable that each axis is restricted to a minimal bandwidth. By applying the principle of split processing to the VS/TM processes, the 'more demanding' axis (here, roll) would be broadcast in 'raw' form, with consequent reduction in bandwidth demands (i.e. there are not, as yet, as many potential values to transmit). This is illustrated in FIG. 9. The pitch axis data can be subjected to VS/TM processes in the transmitter unit, because in this case it is known that the enhancement will not require an increase in the group bit size (n) to transmit all potential values. VS/TM can then be applied to the roll axis data in the receiver unit, enhancing the apparent resolution at no cost. As this is applied to received data, transmission bandwidth overflow is not a relevant problem.

The present invention is accordingly able to exploit the economies of transmission bandwidth made possible with intelligent choice of processing location—particularly (but not exclusively) with expansion based processes. Further, the economies of program size (and therefore, program storage ROM and operating RAM) when processing can be shared among the transmitter processor and the receiver processor. The efficacy and distribution of processor cycle usage can be optimised, for example, non location critical tasks can be moved to the 'least busy' location, freeing up processor time at the critical end of the chain. As a result, smaller (and cheaper) micro controllers/PICs/PALs/GALs can be used in applications which demand complex task processing which would not normally fit in the available resources found at one end of the transmission chain.

Priority and Pre-emptivity

'Gross' state-change requests in either axis (if legal, see below) are prioritised in transmitter and receiver data processing. These demands occur when either the sensor is detecting extreme attitudes, or the user is pressing the digital key pad unit which may be incorporated in the present invention. They elicit a pre-emptive gross response (which disables any TM currently in progress), and override any lesser state-change currently requested by Virtual State synthesis algorithms. This pre-emptive method is applied to both receiver and transmitter processing, so as to optimise responsiveness to a user, because gross functions should always respond with minimal latency.

Priority is assigned to 'control' requests (in the illustrative embodiment, Fire buttons). This is achieved by stripping the transmitted control data from the axis data before any other processing and acting on those control demands immediately (if valid). Low latency in control response is a highly desirable attribute, as it is a most readily observable performance parameter. This prioritisation in the receiver software is preferably accompanied by multiple over-sampling of the control buttons in the transmitter, providing minimal overall latency and high capture reliability. Typically, control channels are over sampled ten times between each transmission packet.

Re-entrancy

It should be noted that all VS/TM processes are 'interruptible': for example, if an axis is currently undergoing TM while a VS is being produced, but heuristic analysis of new input data suggests another state is more appropriate (virtual or real), the current TM processing will be cancelled and the new process instigated. All processing is re-entrant, meaning that it does not require specific initialisation to known states before new processes can take place. This is a desirable feature in process control systems, where external dynamic interaction creates unpredictable state-change requests. This re-entrancy allows for any sequence of processes to be executed without the requisite of major 'housekeeping' functions which would otherwise be required to clean up prior processing artifacts. Significant savings in program space, and increased speed of execution, are a direct consequence.

Error checking

Hardware signal conditioning (i.e. noise reduction) methods are preferably employed to combat ambient interference to the transmitted Pulse Position Modulated bit stream. These include: Automatic Gain Control (AGC) to compensate for varying received levels; bandpass filtering to reject 50–60 Hz interference; and pulse stretching, which inhibits reception of any transient impulses for the stretched period. A corollary of these methods is high bit-wise reliability—if the bit received is within the valid PPM period, it is likely that it is not interference. This 'reliability' can be exploited by algorithms which extract the 'valid' bits of the data stream, even though some corruption of the transmitted packet is evident from further analysis. This further analysis is 'logical' error checking. This is possible because the data transmission is actually a serially encoded, trinary bit stream in a fixed protocol. Standard transmission techniques (known to those in the art) including Cyclic Redundancy Checks (CRC) or checksums could easily, be included in the bit stream to eliminate transmission errors (although they are not deemed necessary in this application). Output data is always latched until valid new data is available —hiding short term errors from the output/user. The logical or 'soft' error strategies are summarised below together with the more conventional 'hard' methods which latching and the like provide. These soft strategies are primarily rule-based algorithms, derived by analytical and empirical studies of the operating domain.

| Type | Description | Method/Strategy |
|---|---|---|
| HARD(1) | complete data corruption | previous data latched through |
| HARD(2) | partial data corruption | update valid data, but utilise parts of previous data to supply corrupted portions |
| HARD(3) | transient sensor error (indeterminacy) | over sampling, averaging, latching |
| 30 SOFT(1) | 'bounds' exceeded | domain limit analysis; restrict to legal max. |
| SOFT(2) | illegal axis state-change | dynamic (acceleration) limits analysis; average with historical data for that axis |
| SOFT(3) | illegal correlated axes | dynamic vs. domain analysis; allow prioritised axis, inhibit lesser axis and substitute historical data for lesser axis. |

Examples of such logical error detection are provided in FIG. 12.

Autopilot

This term is used to describe a 'feature mode' of the device. The mode is toggled on and off by successive actuation of a momentary switch or button. It is engaged because the operator wishes to maintain the current attitude that the device is expressing to the host system, but he/she does not wish to physically maintain the corresponding sensor attitude. A practical example of the need for AutoPilot may be more informative. Suppose the operator wanted to (temporarily) place the device down, or alter their seating position, while maintaining a particular attitude. With Auto-Pilot engaged, all attitude sensing is disabled and arbitrary manipulation of the device is ignored until AutoPilot is disengaged.

Figure 11:
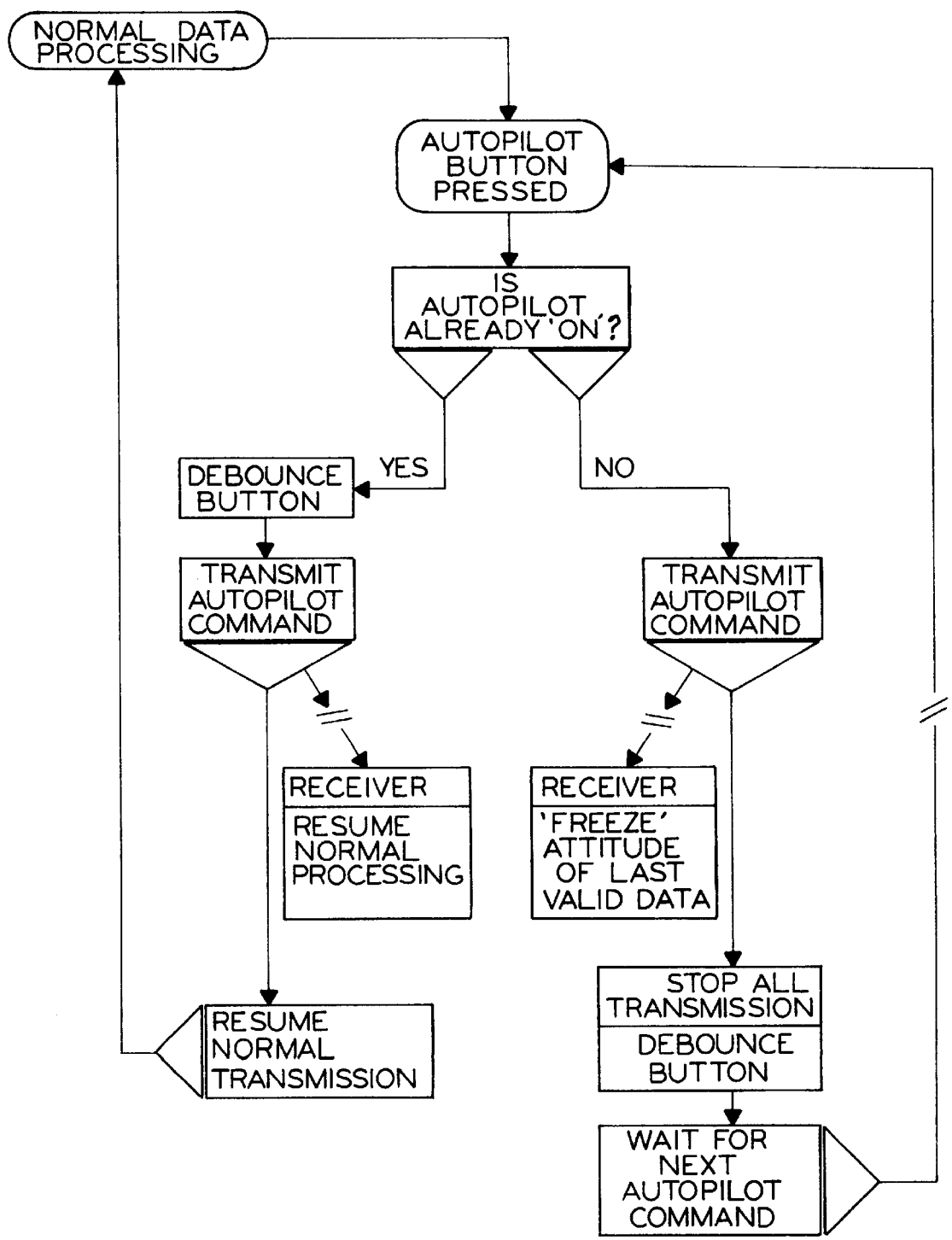
FIG. 11 is a flowchart describing the autopilot process.

Operational ergonomics are significantly enhanced—in fact, this feature is highly desirable in all controller devices which have no physical reference plane (like the desktop) as a rest state, but use an inferential reference, based on cognitive processing of perceptual data. (Inferential methods are well established in humans from an early age, leading to complex functions like 'a sense of balance' etc.) This process is illustrated in FIG. 11.

Priority Encoding

The preferred sensor method produces digital outputs without analog to digital conversion. The mercury switches can be directly connected to BCD encoders as a result. There is a potential for indeterminacy of the switch outputs (dropouts) when the mercury mass is in an unstable inertial condition as a result of certain sensor manipulations. If conventional encoders were used, contiguous closure of all appropriate switches would be mandated to correctly perform the conversion to BCD. Priority encoders, on the other hand, rely solely on the highest input which is currently closed to determine their BCD output value. Thus, a momentary dropout in a lower order input is not reflected in the BCD output. This is a significant (and cheap) method of eliminating indeterminacy errors; it complements software processes directed at overshoot errors, which are logically determined by software processes.

Redundancy

Redundancy analysis of the sensor data is a prime factor in lowering overall power consumption. Briefly, if successive data samples are redundant, there is no obligation to transmit the redundant sample if the receiver is commanded to latch the last sample received. In application, more sophisticated analysis and processing compound this efficiency. The algorithms used in the transmitter cater to multiple level redundancy analysis, with the final level instigating a complete shutdown of the system (the device is effectively 'off'). This is illustrated in FIG. 10. In lower levels, non-redundant data will de-activate the redundancy mode.

Level #1 Redundancy Mode is used when short term redundancies are evident. In this case the transmitter will continue to broadcast the redundant data for a fixed period (the flywheel period) to ensure reliable capture by the receiver.

Level #2 mode is instigated if redundancy persists beyond the flywheel period. It can be assumed that a valid sample will have been received. The transmission process is halted, as no more data transfer is necessary. This grants a significant power saving, as transmission is nominally the most 'expensive' process in the chain. Sensor data is still being analysed however, to ensure that redundancy is still occurring.

It is believed that in practise this mode ('medium') is the most common operational situation. There is another critical aspect to be considered. Irrespective of transmission methods (i.e. PPM, FM, AM etc.), there must always be a time period reserved for transmission of the current data packet, if transmission is required. This period typically imposes the limit on the maximum data throughput of the system. When Level #2 is active, no transmission is required, and the impost of awaiting the completion of the transmission period is removed. This produces a significant (i.e. orders of magnitude) lowering of system latency because it can respond to new, non-redundant data sooner. It increases the transient bandwidth of the system, which is perceptually obvious to the user.

Level #3 mode is ancillary to Level #2. 'Long' periods of redundancy are logically valid if Level #2 has been reached, but AutoPilot is engaged. Obviously, no data transmission is necessary; it is also unnecessary to keep sampling the sensor data, as the only valid operator input is from the AutoPilot button. AutoPilot is toggled by a 'control' signal, which is directly connected to the micro controller, hence, all circuitry used in the sensing chain can be powered down. Further power savings result.

Level #4 mode is only activated after 'extreme' redundancies are detected. Extreme periods are in the order of 5–10 minutes, implying that the operator has finished usage of the device. This mode is termed AutoSleep, and obviates the necessity for an OFF switch, with it's implicit obligation that the operator remembers to use it appropriately. When the device is asleep, the micro controller is in 'HALT' mode, which reduces it's current consumption to micro Amps. All other components are already powered down due to previous redundancy Levels having been reached. At this level of current drain, battery life approximates shelf life. A control signal from a FIRE button (which is directly connected to the battery, and therefore not de-powered by the Power Management system) instigates an interrupt to the micro controller, causing it to go through a wake-up procedure which re-powers all other circuitry. Once awake, any further interrupts from the Fire button are ignored until sleep mode recurs.

It will be appreciated that the present invention is applicable to many applications and implementations other than those described herein. The attitude sensor and sensing system are applicable to other virtual reality type applications other than that described.

I claim:

1. A method of processing sensor data produced by a sensing system, said sensor data having a plurality of possible values for each parameter sensed, at least one of said parameters being related to position, attitude or movement of an object, characterised in that for at least one of said parameters related to position, attitude or movement of an object, said sensor data is processed according to a predetermined instruction set, said predetermined instruction set being also responsive to at least one of the group comprising previous values of said parameter, and current or previous values of other parameters, further responsive to pre-defined heuristic rules relating to the possible allowed values for a set of possible output data values relating to the desired output data such that where rapid changes occur in said sensor data interpolated values between the sensor data are produced as output data in addition to the processed output data correlating to the sensor data.

2. A method according to claim 1, wherein said instruction set is adapted to forbid certain output values apparently defined by said sensor data having regard to the past values of said or other parameters.

3. A method according to claim 1, wherein said instruction set includes instructions relating to the characteristics of a system to which output data is transmitted.

4. A method according to claim 1, wherein said parameters include a given parameter which when set at a pre-defined value causes the output data for at least two other parameters to remain constant despite changes in the sensor data corresponding to those parameters.

5. A method according to claim 1, wherein if said sensor data does not alter for a predetermined period of time, said instruction set causes a reduction in power consumption in said sensing system.

6. A method according to claim 5, wherein said reduction occurs in a plurality of stages.

7. A method according to claim 5, wherein after one or more of the sensor outputs changes, said system returns to normal power consumption.

8. A method according to claim 1, wherein said predetermined instruction set may in response to the current and past states of one or more parameters pre-emptively produce one of said output values.

9. A method according to claim 1, wherein said sensor data comprises attitude data.

10. A method according to claim 9, wherein said sensor data is generated by conductive fluid switches.

11. A system for controlling a computing system, said system including at least one display means, first processing means controlling said display means, and a remote control device adapted to control at least some of the images displayed on said display means, said remote device including a sensing array adapted to produce sensor data corresponding to desired movements of an image on said display means, said sensor data having a plurality of possible values for each parameter sensed, at least one of said parameters being related to position, attitude or movement of an object of the remote device or a part thereof, characterised in that for at least one of said parameters related to position, attitude or movement of the remote device or a part thereof, said sensor data is processed according to a predetermined instruction set, said predetermined instruction set being also responsive to at least one of the group comprising previous values of said parameter, and current or previous values of other parameters, and being further responsive to pre-defined heuristic rules relating to the possible allowed values for a set of possible output data values relating to the desired output data, such that where rapid changes occur in said sensor data, interpolated values of output data between the output data corresponding directly to said sensor data are produced in addition to the output data corresponding directly to said sensor data, said output data being used by said processing means to control images on said display means.

12. A system according to claim 11, wherein said sensor data comprises attitude data.

13. A system according to claim 12, wherein said sensor data is generated by conductive fluid switches.

14. A system according to claim 11, wherein said instruction set includes instructions relating to the characteristics of the images displayed on said screen.

15. A system according to claim 11, wherein said instruction set is adapted to forbid certain output values apparently defined by said sensor data having regard to the past values of said or other parameters.

16. A system according to claim 11, wherein said parameters include a given parameter which when set at a pre-defined value causes the output data for at least two other parameters to remain constant despite changes in the sensor data corresponding to those parameters.

17. A system according to claim 16, wherein said parameter is an autopilot switch, and the output values defined effect the previous position of one or more images on said display means being maintained.

18. A system according to claim 11, wherein if said sensor data does not alter for a predetermined period of time, said instruction set causes a reduction in power consumption in said remote device.

19. A system according to claim 18, wherein said reduction occurs in a plurality of stages.

20. A system according to claim 18, wherein after one or more of the sensor outputs changes, said remote device returns to normal power consumption.

21. A system according to claim 11, wherein said predetermined instruction set may in response to the current and past states of one or more parameters pre-emptively produce one of said output values, so as to alter an image displayed on said display means.

22. A system according to claim 11, wherein said remote device communicates with said first processing means via a wireless connection.

23. A system according to claim 22, wherein and said instruction set encodes said output data for transmission via a link.

24. A system according to claim 23, wherein the link is optical or infra-red.

25. A system according to claim 24, wherein the data is encoded using a carrier-less, pulse position modulation system.

* * * * *